(12) United States Patent
Matsui (10) Patent No.: US 8,850,714 B2
(45) Date of Patent: Oct. 7, 2014

(54) CHROMATICITY CORRECTION DEVICE, CHROMATICITY CORRECTION METHOD, AND DISPLAY DEVICE

(75) Inventor: Katsuyuki Matsui, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 14/347,607

(22) PCT Filed: Sep. 30, 2011

(86) PCT No.: PCT/JP2011/072549

§ 371 (c)(1),
(2), (4) Date: Mar. 26, 2014

(87) PCT Pub. No.: WO2013/046430

PCT Pub. Date: Apr. 4, 2013

(65) Prior Publication Data

US 2014/0218539 A1    Aug. 7, 2014

(51) Int. Cl.
*H04N 17/00* (2006.01)
*H04N 17/02* (2006.01)
*H04N 9/30* (2006.01)
*H04N 17/04* (2006.01)

(52) U.S. Cl.
CPC .............. *H04N 17/045* (2013.01); *H04N 9/30* (2013.01)
USPC ............. 34/179; 348/179; 348/135; 348/180; 348/68; 348/70; 348/234; 348/252; 348/269; 348/277; 348/280; 348/349; 348/353; 348/366; 348/391.1; 348/396.1; 348/474; 348/488; 348/489; 348/493; 348/496; 348/498; 348/602; 348/631; 348/650; 348/655; 348/712; 348/727; 348/730; 348/751; 348/761; 348/766; 348/790; 348/807; 345/77; 345/84; 345/87; 345/88; 345/101; 345/102; 345/204; 345/207; 345/690; 349/61; 349/62; 349/63; 349/64; 349/65; 349/66; 349/67; 349/68; 349/69; 349/70; 349/71

(58) Field of Classification Search
USPC ............. 348/179, 135, 180, 68, 70, 234, 252, 348/269, 277, 280, 349, 353, 366, 391.1, 348/396.1, 474, 488, 489, 493, 496, 498, 348/602, 631, 650, 655, 661, 663, 712, 727, 348/730, 751, 761, 766, 790; 345/77, 84, 345/87, 88, 101, 102, 204, 207, 690; 349/61, 62, 63, 64, 65, 66, 67, 68, 69, 349/70, 71
See application file for complete search history.

(56) References Cited

U.S. PATENT DOCUMENTS

| | | | | |
|---|---|---|---|---|
| 6,727,950 | B1 * | 4/2004 | Nakata | 348/353 |
| 7,825,893 | B2 * | 11/2010 | Oka et al. | 345/102 |
| 7,969,404 | B2 * | 6/2011 | Lee et al. | 345/102 |
| 8,217,968 | B2 * | 7/2012 | Sano et al. | 345/690 |
| 8,295,886 | B2 * | 10/2012 | Kwon et al. | 455/566 |
| 8,330,748 | B2 * | 12/2012 | Sagano | 345/208 |
| 8,368,638 | B2 * | 2/2013 | Yun | 345/102 |
| 8,427,462 | B2 * | 4/2013 | Miyamoto | 345/207 |
| 8,447,363 | B2 * | 5/2013 | Uchikawa et al. | 455/566 |
| 8,648,791 | B2 * | 2/2014 | Lin et al. | 345/102 |
| 2002/0036723 | A1 * | 3/2002 | Ishii et al. | 348/807 |
| 2004/0217719 | A1 * | 11/2004 | Higuchi | 315/312 |
| 2005/0179422 | A1 * | 8/2005 | Chiang | 323/281 |
| 2006/0221046 | A1 * | 10/2006 | Sato et al. | 345/102 |
| 2006/0227148 | A1 * | 10/2006 | Klassen et al. | 345/593 |
| 2008/0018776 | A1 * | 1/2008 | Park et al. | 348/349 |
| 2008/0151144 | A1 * | 6/2008 | Hirose et al. | 349/69 |
| 2009/0237491 | A1 * | 9/2009 | Saito | 348/47 |
| 2009/0244329 | A1 * | 10/2009 | Kuniba | 348/241 |
| 2009/0278790 | A1 * | 11/2009 | Choi et al. | 345/102 |
| 2009/0289965 | A1 * | 11/2009 | Kurokawa et al. | 345/690 |
| 2010/0120471 | A1 * | 5/2010 | Uchikawa et al. | 455/566 |
| 2010/0182346 | A1 * | 7/2010 | Sano et al. | 345/690 |
| 2010/0271409 | A1 * | 10/2010 | Makino et al. | 345/690 |
| 2011/0007055 | A1 * | 1/2011 | Wang | 345/211 |
| 2011/0109655 | A1 * | 5/2011 | Takeda | 345/690 |
| 2011/0157238 | A1 * | 6/2011 | Lin et al. | 345/690 |
| 2011/0193896 | A1 * | 8/2011 | Johnson | 345/690 |
| 2011/0249116 | A1 * | 10/2011 | Yamagishi | 348/135 |
| 2011/0254982 | A1 * | 10/2011 | Seo | 348/234 |
| 2011/0292090 | A1 * | 12/2011 | Otani | 345/690 |

FOREIGN PATENT DOCUMENTS

| JP | 2006-276784 A | 10/2006 |
| JP | 2010-66465 A | 3/2010 |
| JP | 2010-175936 A | 8/2010 |
| JP | 2010-237683 A | 10/2010 |
| JP | 2010-536121 A | 11/2010 |
| JP | 2010-278366 A | 12/2010 |

OTHER PUBLICATIONS

International Search Report in PCT/JP2011/072549 dated Nov. 1, 2011 (English Translation Thereof).

\* cited by examiner

*Primary Examiner* — Jefferey Harold
*Assistant Examiner* — Mustafizur Rahman
(74) *Attorney, Agent, or Firm* — McGinn IP Law Group, PLLC (57) ABSTRACT

A chromaticity correction device corrects chromaticity of a video signal displayed on a display panel of a display device to correspond to a change in a luminance value of the display panel. The chromaticity correction device includes a luminance detection unit which detects the luminance value, a backlight driving level detection unit which detects a backlight driving level, a temperature detection unit which detects an internal device temperature or an ambient temperature, a reference luminance value calculation unit which estimates a reference luminance value in a characteristic of an initial state, a chromaticity calculation unit which obtains a chromaticity change amount of white point chromaticity and estimated white point chromaticity that is an estimated value of current white point chromaticity, a chromaticity correction value calculation unit which obtains a chromaticity correction value and a chromaticity correction circuit which corrects the chromaticity of the video signal.

6 Claims, 5 Drawing Sheets

CHROMATICITY CORRECTION DEVICE, CHROMATICITY CORRECTION METHOD, AND DISPLAY DEVICE

TECHNICAL FIELD

The present invention relates to a chromaticity correction device, a chromaticity correction method, and a display device (e.g., a liquid crystal monitor or a projector).

BACKGROUND ART

In recent years, a display device which displays an image on a display panel using a backlight has been widely used in various fields of industry. For example, a projector (PJ) or an FPD (Flat Panel Display) which displays a video signal supplied from the outside of a device on a display panel using a liquid crystal or a micromirror device has been widely used. Such a display device includes the display panel using the liquid crystal or the micromirror device, and an optical member of a backlight (light source; BL: backlight) which irradiates the display panel with light, such as a super high pressure mercury lamp, a W/RGB LED (Light Emitting Diode) or a cold cathode fluorescent lamp (CCFL). Further, the display device includes, as circuit units, a BL driving unit which controls luminance of light emitted by the backlight, and a circuit which drives the display panel (see Patent Document 1).

When the above-described display device is used as a display device for a graphic design or a medical purpose, display characteristics (stability of color display) designated in advance are required to be maintained for a long period of time.

However, there is a problem associated with the display device in that luminance of a displayed image is degraded and chromaticity gradually yellows over time when the display device is used for a long period of time.

This yellowing of the chromaticity occurs as color balance of each of color components of R (Red), G (Green) and B (Blue) is changed since deterioration speed of luminance deterioration is different according to light emitting materials of each color component of R, G and B when luminance of the RGB light emitting material in the backlight deteriorates over time.

Detection of luminance of light emitted by the backlight using a built-in optical sensor, monitoring of a light emission state of the backlight, and control of the luminance of the backlight are generally performed as a solution to the luminance deterioration of the backlight.

Figure 5:
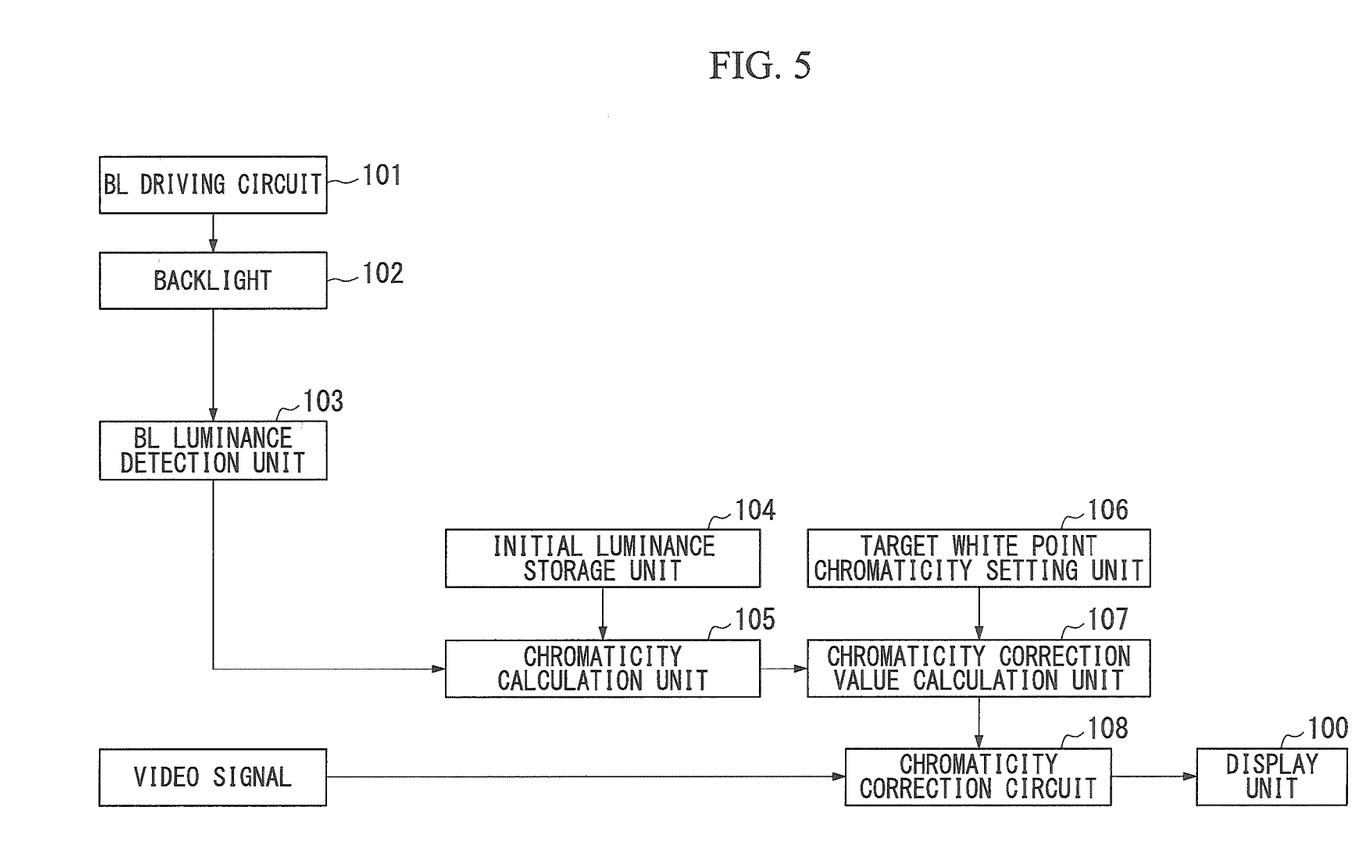
FIG. 5 is a block diagram illustrating a configuration example of a liquid crystal monitor using the chromaticity correction device.

Further, as another solution to the degradation of the luminance of the backlight, for example, in a liquid crystal display device illustrated in FIG. 5, a luminance value in an initial state of a backlight 102 driven by a BL driving circuit 101 is measured and stored in an initial luminance storage unit 104 in advance, and a chromaticity calculation unit 105 calculates current chromaticity based on a difference between the luminance value of this initial state and a current luminance value of the backlight 102 detected by a BL luminance detection unit 103.

Also, a chromaticity correction value calculation unit 107 obtains a difference between white point chromaticity calculated by the chromaticity calculation unit 105 and target white point chromaticity stored in a target white point chromaticity setting unit 106, and calculates this difference as a chromaticity correction value.

Then, a chromaticity correction circuit 108 corrects chromaticity of a video signal input from the outside using the chromaticity correction value calculated by the chromaticity correction value calculation unit 107, and outputs the resultant video signal to a display unit 100 including a display panel configured of a liquid crystal or the like.

However, detection of the white point chromaticity performed by the chromaticity calculation unit 105 requires detection of a luminance value (backlight luminance value) of the light emitted by the backlight when a BL (Back Light) driving level (backlight driving level) and a temperature of the backlight (backlight temperature) in a reference state when the luminance value of the initial state is measured are set.

There are the following problems associated with performance of the correction of the chromaticity due to performance of the detection of the backlight luminance value at this temperature of the reference state.

(a) In a period of use by a user, since a backlight driving level is arbitrary, the backlight driving level used in performing the correction of the chromaticity is not the same as the backlight driving level in the reference state. Therefore, the backlight luminance value corresponding to the reference state cannot be detected, and white point chromaticity for obtaining the chromaticity correction value used for correction of the chromaticity cannot be accurately estimated.

(b) It is necessary for the user to regularly stop use of the liquid crystal display device and execute a process of obtaining the above-described chromaticity correction value, which is a burden to the user.

(c) It is difficult to measure the backlight luminance value at a backlight temperature at which the backlight luminance value of the reference state has been measured, and it is not possible to calculate an accurate chromaticity correction value and perform highly precise correction of the chromaticity.

DOCUMENTS OF THE PRIOR ART

Patent Document

[Patent Document 1]
Japanese Unexamined Patent Application, First Publication, No. 2006-276784

DISCLOSURE OF INVENTION

Problems to be Solved by the Invention

A problem to be solved is that, when a user uses the display device, the current luminance value for being compared with the luminance value of the reference state of the backlight, which is a light source, cannot be measured under a measurement condition of the luminance value of the reference state, and the chromaticity correction value necessary for correction of the chromaticity of the video signal cannot be obtained.

Means for Solving the Problem

A chromaticity correction device of the present invention is a chromaticity correction device which corrects chromaticity of a video signal displayed on a display panel of a display device to correspond to a change in a luminance value of the display panel and is characterized in that the chromaticity correction device includes: a luminance detection unit which detects the luminance value; a backlight driving level detection unit which detects a backlight driving level which is controlling the luminance value; a temperature detection unit which detects an internal device temperature or an ambient temperature corresponding to a temperature of the backlight; a reference luminance value calculation unit which estimates a reference luminance value in a characteristic of an initial state in the backlight driving level and the temperature; a chromaticity calculation unit which obtains a chromaticity change amount of white point chromaticity from the reference luminance value and the luminance value detected by the luminance detection unit, and obtains estimated white point chromaticity that is an estimated value of current white point chromaticity from the chromaticity change amount and initial white point chromaticity which is white point chromaticity in the initial state measured in advance; a chromaticity correction value calculation unit which obtains a chromaticity correction value from the estimated white point chromaticity and target white point chromaticity set in advance; and a chromaticity correction circuit which corrects the chromaticity of the video signal using the chromaticity correction value.

The chromaticity correction device of the present invention is characterized in that the reference luminance value calculation unit includes a conversion expression or a conversion table (a 2D lookup table corresponding to a graph of FIG. 3 in an embodiment) indicating a correspondence between a luminance value in each combination of a temperature detection value indicating an internal device temperature or an ambient temperature measured in the initial state and the backlight driving level, and a combination of the temperature detection value and the backlight driving level, obtains a luminance value corresponding to the backlight driving level detected by the backlight driving level detection unit and the temperature detection value detected by the temperature detection unit using the conversion expression or the conversion table, and uses the luminance value as the reference luminance value.

The chromaticity correction device of the present invention is characterized in that the chromaticity calculation unit includes a conversion means (a conversion expression or a conversion table (a color change amount lookup table illustrated in FIG. 4)) indicating a correspondence between a reference luminance ratio and a chromaticity change amount from initial white point chromaticity that is white point chromaticity in an initial state, and obtains the reference luminance ratio using the luminance value detected by the luminance detection unit and the reference luminance value, determines the chromaticity change amount corresponding to the reference luminance ratio using the conversion means, combines the chromaticity change amount with the initial white point chromaticity stored in advance, and uses a combination result as an estimated white point chromaticity.

The chromaticity correction device of the present invention is characterized in that the chromaticity correction value calculation unit includes a conversion means which indicates a correspondence between a result of a comparison of the estimated white point chromaticity and the target white point chromaticity set in advance, and the chromaticity correction value, and determines the chromaticity correction value corresponding to the comparison result to obtain the color correction value.

A liquid crystal display device of the present invention is a display device having a function of correcting chromaticity of a displayed video signal to correspond to a change in a luminance value and is characterized in that the liquid crystal display device includes: a luminance detection unit which detects the luminance value; a backlight driving level detection unit which detects a backlight driving level which is controlling the luminance value; a temperature detection unit which detects an internal device temperature or an ambient temperature corresponding to a temperature of the backlight; a reference luminance value calculation unit which estimates a reference luminance value which is a luminance value in a characteristic of an initial state in the backlight driving level and the temperature detection value; a chromaticity calculation unit which obtains a chromaticity change amount of white point chromaticity from the reference luminance value and the luminance value detected by the luminance detection unit, and obtains estimated white point chromaticity that is an estimated value of current white point chromaticity from the chromaticity change amount and initial white point chromaticity which is white point chromaticity in the initial state measured in advance; a chromaticity correction value calculation unit which obtains a chromaticity correction value from the estimated white point chromaticity and target white point chromaticity set in advance; a chromaticity correction circuit which corrects the chromaticity of the video signal using the chromaticity correction value; and a display unit which displays the corrected video signal output from the color correction circuit.

A chromaticity correction method of the present invention is a chromaticity correction method for controlling a chromaticity correction device which corrects chromaticity of a video signal displayed on a display panel of a display device to correspond to a change in a luminance value of the display panel, and is characterized in that the chromaticity correction method includes: a luminance detection process for detecting the luminance value; a backlight driving level detection process for detecting a backlight driving level which is controlling the luminance value; a temperature detection process for detecting an internal device temperature or an ambient temperature corresponding to a temperature of the backlight; a reference luminance value calculation process for estimating a reference luminance value which is a luminance value in a characteristic of an initial state in the backlight driving level and the temperature; a chromaticity calculation process for obtaining a chromaticity change amount of white point chromaticity from the reference luminance value and the luminance value detected by the luminance detection process, and obtaining estimated white point chromaticity that is an estimated value of current white point chromaticity from the chromaticity change amount and initial white point chromaticity which is white point chromaticity in the initial state measured in advance; a chromaticity correction value calculation process for obtaining a chromaticity correction value from the estimated white point chromaticity and target white point chromaticity set in advance; and a chromaticity correction process for correcting the chromaticity of the video signal using the chromaticity correction value.

Effects of the Invention

With the liquid crystal monitor of the present invention, since the reference backlight luminance value is obtained based on the backlight temperature and the backlight driving level which are measurable even when a user uses the liquid crystal monitor, an estimated white point chromaticity is estimated from this reference backlight luminance value and the measured backlight luminance value, and the chromaticity correction value is obtained from this estimated white point chromaticity and the target white point chromaticity set in advance, it is not necessary for the current backlight luminance value for being compared with the backlight luminance value of the reference state to be measured on a measurement condition of the luminance value of the reference state. Therefore, it is possible to obtain the chromaticity correction value necessary for correction of chromaticity of the video signal in real time.

EMBODIMENTS FOR CARRYING OUT THE INVENTION

The chromaticity correction device of the present invention obtains current white point chromaticity of emission light emitted by a backlight of a liquid crystal display device based on a backlight luminance value which is a luminance value of the backlight of the liquid crystal display device and a backlight driving level for controlling luminance of the emission light emitted by the backlight. Also, a chromaticity correction value is obtained based on this white point chromaticity and target white point chromaticity set for each liquid crystal panel of a display unit in advance, chromaticity of a video signal input from the outside is corrected based on this chromaticity correction value, and the corrected video signal whose chromaticity has been corrected is supplied to the display unit.

The chromaticity correction device of the present invention realizes, through the configuration described above, the correction of the video signal in real time without restricting use of the liquid crystal display device since a change over time of the luminance of the light emitted by the backlight is obtained from the current backlight luminance value and the backlight driving level for emitting this backlight luminance value, and correction of the chromaticity change of the display unit due to a change in the backlight luminance value is performed. A chromaticity characteristic is white point chromaticity in a video display surface, and is determined based on color balance of three or more primary colors (e.g., RGB) held by each display device.

Embodiment 1

Hereinafter, a chromaticity correction device and a liquid crystal display device using this chromaticity correction device according to an embodiment of the present invention will be described with reference to the drawings.

Figure 1:
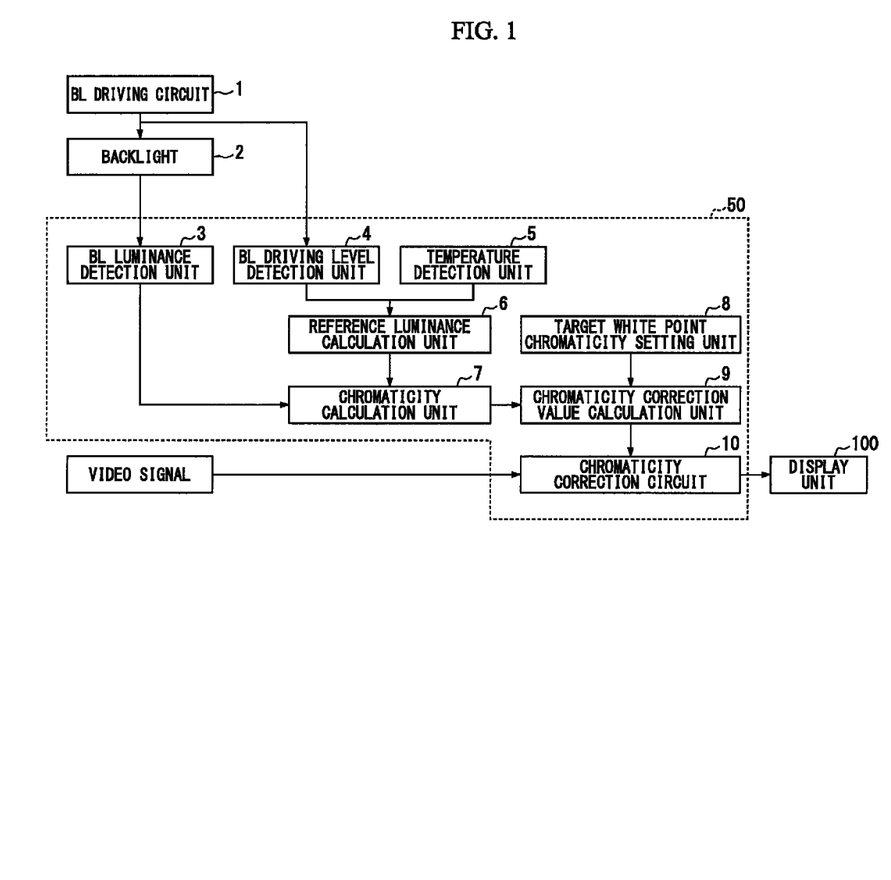
FIG. 1 is a block diagram illustrating a configuration example of a liquid crystal monitor using a chromaticity correction device according to an embodiment of the present invention.

FIG. 1 is an external view of a liquid crystal display device (hereinafter, a liquid crystal monitor) with a chromaticity correction device 50 according to an embodiment of the present invention.

This liquid crystal monitor includes a BL driving circuit 1, a backlight 2, a BL luminance detection unit 3, a BL driving level detection unit 4, a temperature detection unit 5, a reference luminance calculation unit 6, a chromaticity calculation unit 7, a target white point chromaticity setting unit 8, a chromaticity correction value calculation unit 9, a chromaticity correction circuit 10, and a display unit 100. Here, the display unit 100 includes a liquid crystal panel, and performs display of a video signal supplied from an external device through control of an opening degree of a display element of a liquid crystal panel corresponding to a gradient of each pixel in the video signal.

The backlight 2 is a light source, and a cold cathode fluorescent lamp, an LED (Light Emitting Diode) or the like is used. The backlight 2 is arranged in a position facing a surface opposite to a display surface of the liquid crystal panel of the display unit 100, and emits emission light having a desired backlight luminance value used for display of the liquid crystal panel.

The BL driving circuit 1 detects a backlight driving level for controlling a backlight luminance value of the light emitted by the backlight 2 based on a luminance value of the input video signal, and outputs the backlight driving level to the backlight 2.

For example, when a cold cathode fluorescent lamp is used for the light source constituting the backlight 2 used for the display unit 100 and driven by a current dimming inverter, an effective value of the current supplied to the inverter is changed. Further, when the light source is an LED, a pulse width of a voltage supplied to an LED driving circuit or a peak value of the voltage is changed.

Further, the chromaticity correction device 50 includes a BL luminance detection unit 3, a BL driving level detection unit 4, a temperature detection unit 5, a reference luminance calculation unit 6, a chromaticity calculation unit 7, a target white point chromaticity setting unit 8, a chromaticity correction value calculation unit 9, and a chromaticity correction circuit 10.

The chromaticity correction device 50 obtains a chromaticity correction value based on the backlight luminance value of the light emitted by the backlight 2 and the backlight driving level that the BL driving circuit 1 outputs to the backlight when this luminance value is emitted, corrects the chromaticity of the video signal supplied from the outside based on this chromaticity correction value, and supplies a correction chromaticity signal to the display unit 100.

The BL luminance detection unit 3 detects a luminance value of the light emitted by the backlight. Here, the BL luminance detection unit 3 measures a backlight luminance value (e.g., measurement unit: cd (candela)/m$^2$) that is a luminance value of the backlight, for example, using a backlight sensor including a phototransistor or the like.

Further, the BL luminance detection unit 3 includes an AD (Analog Digital) converter which converts an analog electrical signal output by the backlight sensor into a backlight luminance value of a digital signal.

The BL driving level detection unit 4 reads the backlight driving level that the BL driving circuit 1 outputs to the backlight at a timing at which the BL luminance detection unit 3 detects the backlight luminance value of the light emitted by the backlight 2.

The temperature detection unit 5 performs measurement of a backlight temperature that is a temperature of the backlight 2 at a timing when the BL luminance detection unit 3 detects the backlight luminance value of the light emitted by the backlight 2. This temperature detection unit 5 includes a temperature sensor installed in contact with or near the backlight 2, and an A/D converter which converts an analog value output by this temperature sensor into the backlight temperature which is data of a digital value.

Here, while it is preferable for the temperature sensor to be arranged near the backlight 2 if possible, the temperature sensor may be arranged either inside the device or outside the device as long as a temperature of an environment around the chromaticity correction device or the backlight 2 in the display device (a temperature inside the display device in which the backlight is arranged or an ambient temperature of a place in which the display device with the backlight is arranged) can be measured.

The backlight driving level and the backlight temperature described above are measured because the backlight driving level and the backlight temperature are used as parameters in obtaining a reference backlight luminance since the backlight luminance value of the light emitted by the backlight 2 is greatly changed depending on the backlight driving level given to the backlight 2 and the temperature of the backlight 2.

Figure 2:
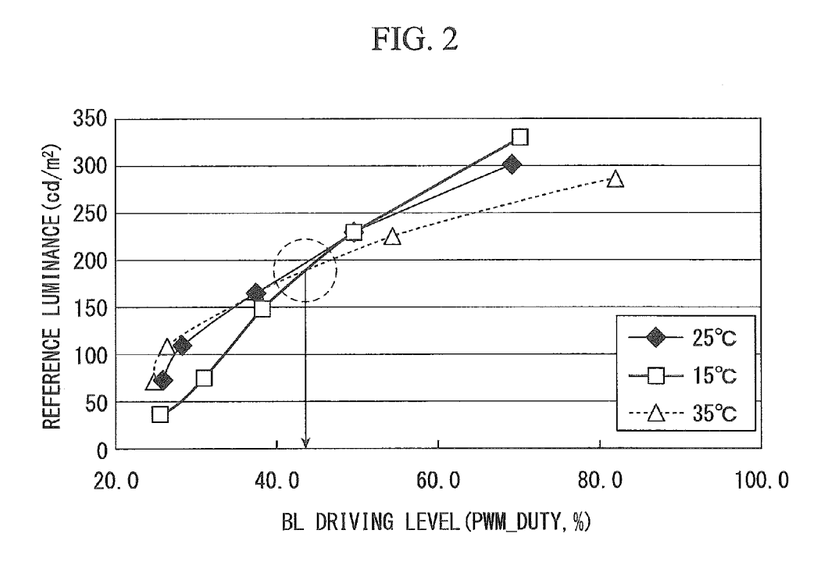
FIG. 2 is a graph illustrating a correspondence between a backlight driving level and a reference backlight luminance value at each temperature measured through an experiment.

Next, FIG. 2 is a graph illustrating a correspondence between the backlight driving level and the reference backlight luminance value at each of temperatures (e.g., 15° C., 25° C., and 35° C.) measured through an experiment.

It is seen from FIG. 2 that the reference backlight luminance value of the light emitted by the supplied backlight driving level is different according to each temperature of the backlight 2.

Here, the BL luminance detection unit 3, the BL driving level detection unit 4, and the temperature detection unit 5 perform processes of acquiring the backlight luminance value, the backlight driving level, and the backlight temperature in each chromaticity correction period which is a certain time width set in advance.

The reference luminance calculation unit 6 obtains the reference backlight luminance value based on the backlight driving level supplied to the backlight 2 detected by the BL driving level detection unit 4 and the backlight temperature of the backlight 2 detected by the temperature detection unit 5.

This reference backlight luminance value is a backlight luminance value which is measured corresponding to the backlight driving level and the backlight temperature of the backlight 2 in advance, in an initial state of the backlight 2. This initial state is a time at which the backlight 2 is mounted on the liquid crystal display device, that is, a state having a characteristic of the luminance value of the light emitted in a plurality of combinations of the backlight temperature and the backlight driving level in an initial step of an actually elapsed time of use of the backlight 2. Further, the initial state described above may be a time at which a user himself or herself calibrates the display device using a color sensor or the like.

Also, the backlight luminance is measured as the reference backlight luminance value in each combination of the backlight driving level and the backlight temperature within a range of an actually used environment in advance, and a 2D (2Dimension) lookup table (backlight reference value table) indicating a correspondence relationship among the backlight driving level, the backlight temperature and the reference backlight luminance value is written to and stored in an internal storage unit of the reference luminance calculation unit 6.

Figure 3:
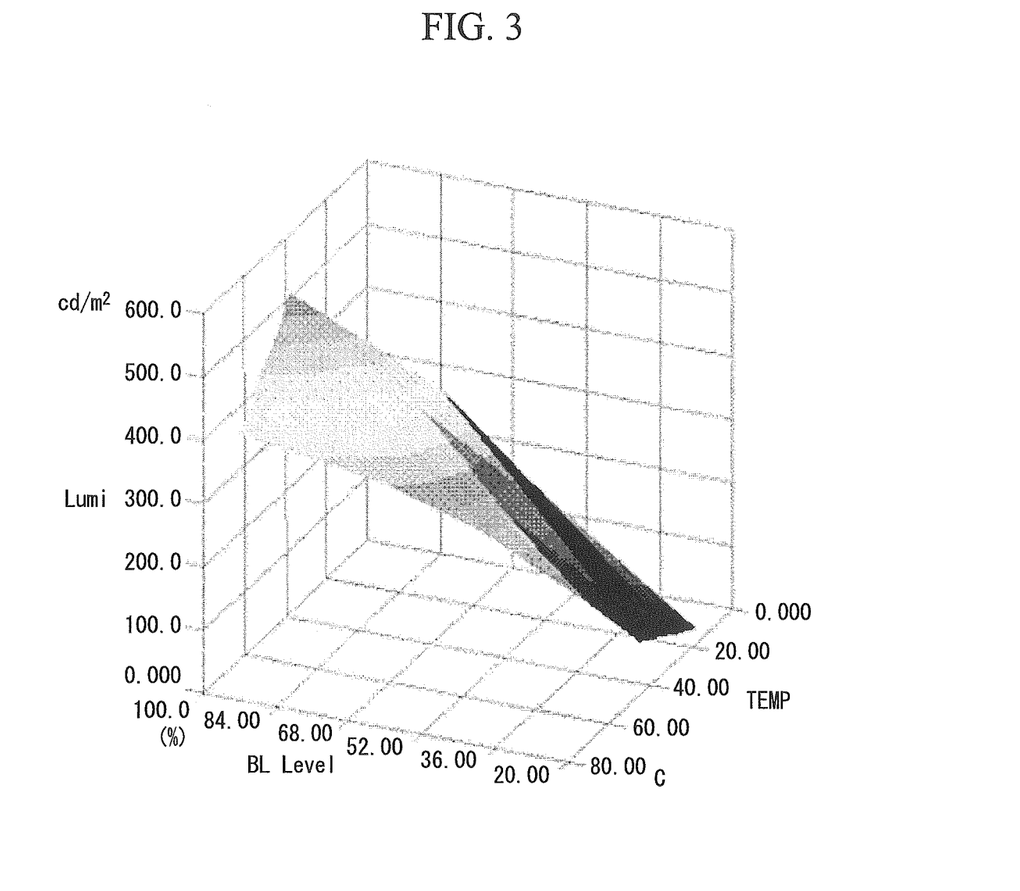
FIG. 3 is a three-dimensional graph illustrating a correspondence among a backlight driving level and a backlight temperature of a backlight 2, which have been measured, and a backlight luminance value in a 2D lookup table.

Next, FIG. 3 is a three-dimensional graph illustrating a correspondence among the backlight driving level, the backlight temperature of the backlight 2, and the backlight luminance value measured in the 2D lookup table. This three-dimensional graph is a coordinate space including three axes of the reference backlight luminance value (Lumi), the backlight temperature (TEMP), and the backlight driving level (BL Level).

Therefore, the reference luminance calculation unit 6 obtains the reference backlight luminance value in a current backlight driving level and a current backlight temperature of the backlight 2 by reading a reference backlight luminance value corresponding to a combination of the supplied backlight driving level and the temperature of the backlight 2 from the 2D lookup table stored in the internal storage unit.

Further, the reference luminance calculation unit 6 may have a configuration in which an expression for multinomial development similar to a characteristic of the reference backlight luminance value of the lookup table is stored in the internal storage unit, and the reference backlight luminance value is calculated by substituting the backlight driving level and the temperature of the backlight 2 into this expression of multinomial development, in order to reduce a capacity of the internal storage unit.

Further, the reference backlight luminance value may be an absolute luminance value or may be a ratio or a relative luminance value to a backlight luminance value which is any reference. For example, when the reference backlight luminance value is the relative luminance value, it is desirable for the luminance value to be normalized with a backlight luminance value in a backlight driving level (a BL driving level; the inside of a dotted circle in FIG. 2) in which a change in the luminance value is small even when the temperature of the backlight 2 is changed.

In this case, when calculating the reference luminance ratio which will be described below, the chromaticity calculation unit 7 multiplies the relative luminance value with the backlight luminance value used for normalization to obtain a reference backlight luminance value, and then divides the backlight luminance value (current luminance) detected by the BL luminance detection unit 3 by the reference backlight luminance value (reference luminance) obtained by the reference luminance calculation unit 6.

The chromaticity calculation unit 7 performs a process of estimating estimated white point chromaticity that is current white point chromaticity based on the backlight luminance value detected by the BL luminance detection unit 3, the reference backlight luminance value obtained by the reference luminance calculation unit 6, and the temperature of the backlight 2 measured by the temperature detection unit 5.

In other words, the chromaticity calculation unit 7 performs the process of estimating the current white point chromaticity using a chromaticity change amount lookup table of the reference luminance ratio and the chromaticity change amount stored in the internal storage unit. Here, the reference luminance ratio is a value obtained by dividing the backlight luminance value detected by the BL luminance detection unit 3 by the reference backlight luminance value obtained by the reference luminance calculation unit 6.

Figure 4:
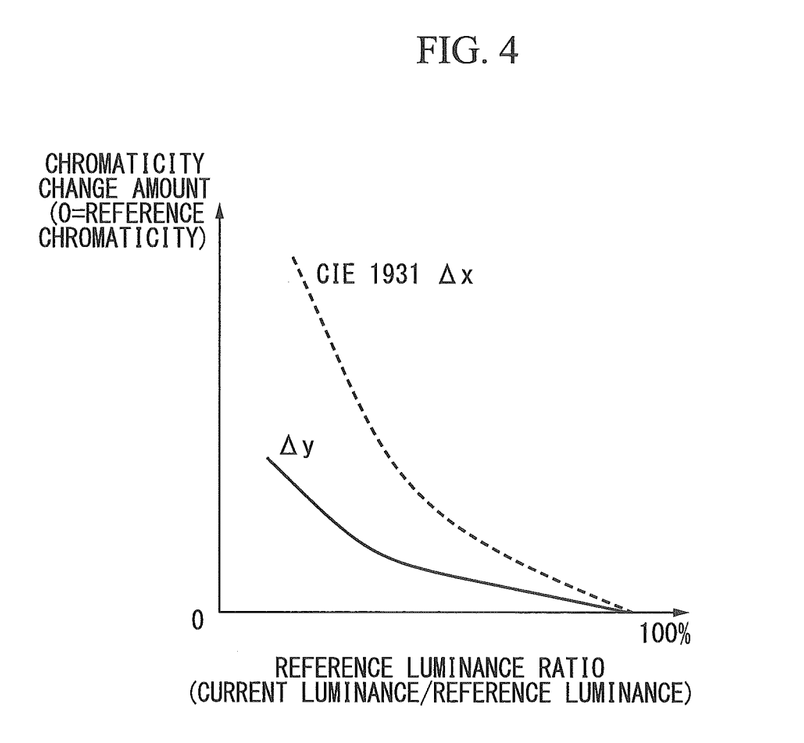
FIG. 4 is a graph illustrating a correspondence relationship between a reference luminance ratio and a chromaticity change amount Δx of an x value and a correspondence relationship between the reference luminance ratio and a chromaticity change amount Δy of a y value, which corresponds to a chromaticity change amount lookup table indicating a correspondence between the reference luminance ratio and the chromaticity change amount.

Next, FIG. 4 is a graph illustrating a correspondence relationship between the reference luminance ratio and a chromaticity change amount $\Delta x$ of an x value and a correspondence relationship between the reference luminance ratio and a chromaticity change amount $\Delta t$ of a y value, which correspond to the chromaticity change amount lookup table indicating the correspondence between the reference luminance ratio and the chromaticity change amount. The chromaticity change amount $\Delta x$ and the chromaticity change amount $\Delta y$ indicate change amounts from a reference x value and a reference y value of initial white point chromaticity in the initial state measured in advance, which correspond to the reference luminance value, respectively.

Here, the x value and the y value used in FIG. 4 indicate numerical values converted from an RGB color system into an xyz color system, as follows, and a value of each of RGB is substituted into the following color to perform a conversion process.

$$X=2.7689+1.7517G+1.1302B$$

$$Y=R+405907G+0.0601B$$

$$Z=0.0565G+505943B$$

Further, when each of an X value, a Y value and a Z value in an XYZ color system is shown using a graph, three axes of the X value, the Y value and the Z value are necessary, and therefore, it is generally necessary to two-dimensionally express the XYZ color system and an x value, a y value and a z value are used in place of the X value, the Y value and the Z value in order to simplify display. The x value, the y value, and the z value are expressed using the X value, the Y value and the Z value obtained by converting R, G and B values by the CIE1931 regulation, as follows.

$$x=X/(X+Y+Z)$$

$$y=Y/(X+Y+Z)$$

$$z=1-(x+y)=Z/(X+Y+Z)$$

Further, in this embodiment, a chromaticity diagram is conveniently shown as an XYZ chromaticity diagram of the XYZ color system using the x value and the y value since Y represents a stimulus value of brightness.

Further, in the chromaticity calculation unit 7, the x value and the y value of the white point chromaticity in the initial state are written and stored as the initial white point chromaticity in the internal storage unit in advance. The white point chromaticity change amounts Δx and Δy in FIG. 4 are a correspondence between the luminance decrease rate at the time of use for a long period of time and the change amount of the white point chromaticity from the initial white point chromaticity at that time in the liquid crystal display device which is a correction target, and are written to and stored in the internal storage unit of the chromaticity calculation unit 7 in advance.

Here, white point chromaticity of the light emitted by the backlight 2 greatly changes depending on the luminance decrease rate (a change in a luminous efficiency of the light source). Therefore, a change in backlight chromaticity value of the backlight 2 (a change in color balance in each color component of the light emitted by the backlight 2) can be detected with high precision by detecting the luminance decrease rate of the white point chromaticity.

Also, the chromaticity calculation unit 7 reads the reference x value and the reference y value of the reference white point chromaticity of the initial state from the internal storage unit, causes the reference x value and the reference y value to correspond to the reference luminance ratio indicating the luminance decrease rate, and reads the chromaticity change amount Δx and the chromaticity change amount Δy from the chromaticity change amount lookup table from the internal storage unit.

After reading the data of each chromaticity change amount from the chromaticity change amount lookup table in the internal storage unit, the chromaticity calculation unit 7 adds the white point chromaticity (x value and y value) of the initial state to the chromaticity change amount (Δx and Δy) read from the chromaticity change amount lookup table to obtain an addition result as the estimated white point chromaticity that is the current estimated white point chromaticity.

Further, a relationship between the reference luminance ratio and the chromaticity change amount is obtained through an experiment, and the chromaticity calculation unit 7 writes and stores a conversion expression for converting the reference luminance ratio obtained from this relationship into the chromaticity change amount in the internal storage unit in advance, instead of obtaining the chromaticity change amount using the chromaticity change amount lookup table described above. Also, the chromaticity calculation unit 7 may be configured to obtain the chromaticity change amount (Δx and Δy) from the reference luminance ratio through the conversion expression in the internal storage unit.

The target white point chromaticity setting unit 8 has an internal storage unit. The target white point chromaticity is set as, for example, white point chromaticity according to characteristics of the backlight 2 and the liquid crystal panel of the display unit 100 using an arbitrary value by a user in advance, and is written to and stored in the internal storage unit.

The chromaticity correction value calculation unit 9 reads the estimated white point chromaticity from the chromaticity calculation unit 7 and reads the target white point chromaticity from the target white point chromaticity setting unit 8.

Also, the chromaticity correction value calculation unit 9 obtains a chromaticity correction value from the estimated white point chromaticity (estimated x value and estimated y value) obtained by the chromaticity calculation unit 7 and the target white point chromaticity (target x value and target y value) read from the target white point chromaticity setting unit 8. In other words, the chromaticity correction value calculation unit 9 subtracts the target white point chromaticity from the estimated white point chromaticity, and uses a subtraction result as a chromaticity correction value (corrected x value and corrected y value).

The chromaticity correction circuit 10 includes an internal storage unit in which a correction coefficient table indicating a correspondence between a combination of the corrected x value and the corrected y value in the chromaticity correction value and a correction coefficient to be multiplied with each of the R value, the G value and the B value of the RGB color system corresponding to this combination is written and stored in advance.

Further, the chromaticity correction circuit 10 reads the correction coefficient corresponding to the chromaticity correction value supplied from the chromaticity correction value calculation unit 9 from the correction coefficient table of the internal storage unit, multiplies each of the R value, the G value and the B value of the video signal with the correction coefficient, and outputs a video signal of the R value, the G value and the B value, which have been corrected, to the display unit 100.

Further, the chromaticity correction value calculation unit 9 may divide the estimated white point chromaticity by the target white point chromaticity and use a division result as a chromaticity correction value (corrected x value and corrected y value).

Further, another configuration of the chromaticity correction circuit 10 may be a configuration in which the R value, the G value and the B value of the video signal are corrected using the chromaticity correction value through the following process.

In other words, the chromaticity correction circuit 10 converts the chromaticity of the RBG color system of the video signal input from the outside into the XYZ color system, and also converts the X value, the Y value, and the Z value, i.e., the XYZ color system described above, into the x value, the y value, and the z value of the xyz color system.

Further, the chromaticity correction circuit 10 adds the corrected x value and the corrected y value that are the chromaticity correction values obtained by the chromaticity correction value calculation unit 9 to the x value, the y value, and the z value of the video signal to calculate the x value, the y value, and the z value which have been corrected.

Also, the chromaticity correction circuit 10 calculates the X value, the Y value, and the Z value from the x value, the y value, and the z value which have been corrected, obtains chromaticity of RGB from the X value, the Y value and Z value, and outputs the chromaticity to the display unit 100 as the video signal.

Through the process described above, an LCD driving unit in the display unit 100 adjusts transmittance of a liquid crystal color filter in the liquid crystal pane according to the R value, the G value and the B value in the corrected video signal input from the chromaticity correction circuit 10. Also, the liquid crystal color filter using a 3-primary color filter whose transmittance is adjusted transmits white light emitted by the backlight 2, which is the light source, with a transmission amount corresponding to the transmittance and displays the image whose luminance and chromaticity have been corrected on the liquid crystal panel.

According to this embodiment, since the correction of the chromaticity for display on the liquid crystal display device is performed based on the change amount of the white point chromaticity corresponding to the change in the luminance value of the backlight, white balance of the chromaticity of the video signal displayed on the liquid crystal panel by the display unit 100 can always be held to be constant for a long period of time, as described above. Since the backlight sensor used in this case includes one photodiode which measures a luminance value of the white light of the backlight 2 rather than a color sensor, a sensor having a simpler configuration than the color sensor is available.

Further, according to this embodiment, since the chromaticity of the video signal is adjusted only from the backlight luminance value of the backlight 2 and the backlight driving level for the backlight 2, the correction of the chromaticity can be easily performed without a user stopping use of the liquid crystal display device, i.e., without a process of detecting the chromaticity under a set condition, unlike a conventional case.

Next, operation of a chromaticity correction process in this embodiment will be described hereinafter with reference to FIG. 1.

Step S1:

When a correction period in which the video signal is corrected arrives, the BL driving level detection unit 4 reads the backlight driving level supplied to the backlight 2 and outputs the backlight driving level to the reference luminance calculation unit 6.

Further, the temperature detection unit 5 detects the backlight temperature of the backlight 2 and outputs the detected backlight temperature to the reference luminance calculation unit 6.

Further, the BL luminance detection unit 3 detects the backlight luminance value that is a luminance value of the backlight 2 and outputs the detected backlight luminance value to the chromaticity calculation unit 7.

Step S2:

When the backlight driving level and the backlight temperature value are supplied, the reference luminance calculation unit 6 reads the reference backlight luminance value corresponding to the combination of the supplied backlight driving level and the supplied backlight temperature value from the 2D lookup table stored in the internal storage unit.

Also, the reference temperature calculation unit 6 outputs the reference backlight luminance value read from the 2D lookup table to the chromaticity calculation unit 7.

Step S3:

Then, the chromaticity calculation unit 7 divides the backlight luminance value supplied from the BL luminance detection unit 3 by the reference backlight luminance value supplied from the reference luminance calculation unit 6, and uses a division result as the reference luminance ratio.

Also, the chromaticity calculation unit 7 reads the chromaticity change amount $\Delta x$ and the chromaticity change amount $\Delta y$ corresponding to the obtained reference luminance ratio from the chromaticity change amount lookup table stored in the internal storage unit.

Then, the chromaticity calculation unit 7 adds the chromaticity change amount $\Delta x$ and the chromaticity change amount $\Delta y$ to the initial x value and the initial y value which are white point chromaticity of the initial state stored in the internal storage unit.

The chromaticity calculation unit 7 adds the chromaticity change amount $\Delta x$ to the initial x value to calculate an estimated x value and adds the chromaticity change amount $\Delta y$ to the initial y value to calculate an estimated y value.

Also, the chromaticity calculation unit 7 outputs the estimated x value and the estimated y value, which have been calculated, to the chromaticity correction value calculation unit 9 as estimated white point chromaticity.

Step S4:

Then, when the estimated white point chromaticity is supplied from the chromaticity calculation unit 7, the chromaticity correction value calculation unit 9 reads a target x value and a target y value that are target white point chromaticity from the target white point chromaticity setting unit 8.

Also, the chromaticity correction value calculation unit 9 subtracts the target x value and the target y value in the target white point chromaticity from the estimated x value and the estimated y value in the estimated white point chromaticity which has been read.

Then, the chromaticity correction value calculation unit 9 uses a difference between the subtraction results as a chromaticity correction value, that is, uses a result of subtracting the target x value from the estimated x value as a correction value x, uses a result of subtracting the target y value from the estimated y value as a correction value y, and uses a combination of the correction value x and the correction value y as a chromaticity correction value.

Also, the chromaticity correction value calculation unit 9 outputs the obtained chromaticity correction value to the chromaticity correction circuit 10.

Step S5:

Then, the chromaticity correction circuit 10 reads the correction coefficient (a set of an R-value correction coefficient CR, a G-value correction coefficient CG, and a B-value correction coefficient CB) corresponding to a combination of the correction value x and the correction value y in the chromaticity correction value supplied from the chromaticity correction value calculation unit 9, from the correction coefficient table stored in the internal storage unit.

Also, each time a video signal is supplied, the chromaticity correction circuit 10 multiplies an R value, a G value and a B value in the video signal by the R-value correction coefficient CR, the G-value correction coefficient CG, and the B-value correction coefficient CB, respectively.

Then, the chromaticity correction circuit 10 uses a result of multiplying the R value by the R-value correction coefficient CR as a corrected R value, a result of multiplying the G value by the G value correction coefficient CG as a corrected G value, and a result of multiplying the B value by the B-value correction coefficient CB as a corrected B value.

Also, the chromaticity correction circuit 10 outputs the corrected R value, the corrected G value and the corrected B value obtained by correcting the R value, the G value and the B value to the display unit 100 as a video signal after correction.

Further, in this embodiment, the reference backlight luminance value corresponding to the current temperature and the current backlight driving level of the backlight 2 has been calculated, and this reference backlight luminance value and the measured backlight luminance value have been compared to estimate the chromaticity change amount, as described above.

However, in another embodiment, the temperature and the backlight driving level for the reference luminance are fixed, and the detected current luminance is corrected corresponding to the temperature and the backlight driving level in this reference luminance. The same effects as those in the embodiment described above can be obtained when the current luminance and the reference luminance are compared.

In this case, it is desirable for the reference luminance to be set corresponding to a driving level in which a change in the luminance is small even when the temperature is changed. For example, in FIG. 2, the circular part indicated by a dotted line has a small luminance change with the temperature change. Therefore, the luminance of the backlight 2 when the backlight driving circuit 1 is driven by the backlight driving level indicated by the circular part is used as the reference luminance.

In other words, the reference luminance calculation unit 6 holds the backlight temperature and the backlight driving level measured in the initial state in advance, and the backlight luminance value when the backlight temperature and the backlight driving level are given to the backlight 2 in the internal storage unit as a reference status value.

Also, in the reference luminance calculation unit 6, a 2D lookup table indicating a correspondence among the backlight driving level and the backlight temperature of the backlight 2 which have been measured and the backlight luminance value, which is similar to that of the embodiment described above, is stored in the internal storage unit.

Then, the reference luminance calculation unit 6 reads detection values of the backlight luminance value detected by the BL luminance detection unit 3, the backlight temperature detected by the temperature detection unit 5, and the backlight driving level detected by the BL driving level detection unit 4.

In another embodiment, the BL luminance detection unit 3 and the reference luminance calculation unit 6 are connected, whereas the BL luminance detection unit 3 and the chromaticity calculation unit 7 are not connected in FIG. 1, unlike the embodiment described above.

Also, the reference luminance calculation unit 6 reads a backlight luminance value A corresponding to the backlight temperature and the backlight driving level in the detection values from the 2D lookup table.

Then, the reference luminance calculation unit 6 reads a backlight luminance value B corresponding to the backlight temperature and the backlight driving level in the above-described reference status value from the 2D lookup table.

Also, the reference luminance calculation unit 6 corrects the current luminance to correspond to the backlight temperature and the backlight driving level in the reference status value to obtain a backlight luminance value C. For example, the backlight luminance value C is a numerical value obtained by multiplying the current luminance by a numerical value as a coefficient obtained by dividing the above-described backlight luminance value B by the backlight luminance value A.

Then, the reference luminance calculation unit 6 outputs the backlight luminance value in the read reference status value and the above-described backlight luminance value C to the chromaticity calculation unit 7.

Also, the chromaticity calculation unit 7 divides the input backlight luminance value C by the input reference backlight luminance value in the backlight reference value to obtain a reference luminance ratio. The following process is similar to that in the embodiment described above.

Further, in yet another embodiment, calculation of the reference luminance ratio described above may be performed, as follows.

In yet other embodiment, the BL luminance detection unit 3 and the reference luminance calculation unit 6 are connected, whereas the BL luminance detection unit 3 and the chromaticity calculation unit 7 are not connected in FIG. 1, as in the other embodiment described above.

In the present invention, a calculation expression for obtaining the reference luminance ratio is characterized by using three elements of the following A, B and C.

In other words,

A. A luminance change characteristic of FIG. 3 (the luminance value corresponding to the combination of the temperature and the backlight driving level)

B. Initial luminance, temperature, and backlight driving level

C. Current luminance, temperature, and backlight driving level.

Hereinafter, a method of calculating a reference luminance ratio in the other embodiment will be described.

First, an initial characteristic of a produced display device is stored at a time immediately after calibration of the produced display device, such as at the time of factory production, as follows.

The BL driving level detection unit 4 reads a backlight driving level at the time of an initial characteristic setting from the BL driving circuit 1 and outputs the backlight driving level to the reference luminance calculation unit 6.

Further, the temperature detection unit 5 reads a temperature at the time of the initial characteristic setting and outputs the temperature to the reference luminance calculation unit 6.

When the backlight driving level and the temperature at the time of the initial characteristic setting are supplied, the reference luminance calculation unit 6 uses the supplied temperature and backlight driving level as search conditions and reads the reference luminance from the 2D lookup table of FIG. 3 stored in the internal storage unit in advance.

Also, the reference luminance calculation unit 6 reads, from the BL luminance detection unit 3, the luminance at the time of the initial characteristic setting of the backlight 2 at the time of the initial characteristic setting detected by the BL luminance detection unit 3.

Further, the reference luminance calculation unit 6 calculates a ratio of the reference luminance read from the 2D lookup table of the internal storage unit described above and the luminance at the time of the initial characteristic setting received from the BL luminance detection unit 3 using the temperature and the backlight driving level at the time of the initial characteristic setting. The reference luminance calculation unit 6 stores this calculated ratio as an initial status value (InitStatus).

Next, a chromaticity detection procedure when a display device is shipped and used by a user will be described.

First, the BL driving level detection unit 4 of the display device reads a current backlight driving level from the BL driving circuit 1 and outputs the read current backlight driving level to the reference luminance calculation unit 6.

Further, the temperature detection unit 5 detects the current temperature and outputs the detected current temperature to the reference luminance calculation unit 6.

Then, when the current backlight driving level and the current temperature are supplied, the reference luminance calculation unit 6 uses the current temperature and the current backlight driving level which have been supplied as search conditions and reads reference luminance from the 2D lookup table of FIG. 3 stored in the internal storage unit in advance.

The reference luminance calculation unit 6 reads the current luminance of the backlight 2 detected by the BL luminance detection unit 3 from the BL luminance detection unit 3.

The reference luminance calculation unit 6 calculates a current status value (CurrentStatus) that is a ratio of the reference luminance read from the 2D lookup table using the current temperature and the current backlight driving level, and the current luminance supplied from the BL luminance detection unit 3.

The reference luminance calculation unit 6 then divides this calculated current status value (CurrentStatus) by the above-described initial status value (InitStatus), that is, calculates the reference luminance ratio through calculation using the following expression.

Reference luminance ratio=current status value (CurrentStatus)/initial status value (InitStatus)

The following process is similar to that in the embodiment described above.

Further, while the liquid crystal display device has been described by way of example in each embodiment described above, the present invention is applicable to various display devices which perform displaying using a light source such as a backlight, including a projector or a display using a liquid crystal or a micromirror device.

Further, any of a super high pressure mercury lamp, a W/RGB LED, and a cold cathode fluorescent lamp (CCFL) may be used as the backlight serving as the light source described above. When the luminance value of each light source is detected, the BL luminance detection unit 3 may be configured to detect a luminance value of a screen of the display panel in the display unit 100 or detect a luminance value in a side surface or a back surface of the display panel.

In other words, in the embodiment described above, a configuration in which the luminance value is detected in a side surface or a back surface of the display panel in order to prevent an aesthetic appearance experienced by a user watching a screen from being degraded, including shielding a part of the image displayed on the display panel, in the case of the configuration in which the BL luminance detection unit 3 detects the luminance value in the front surface of the display panel, may be adopted.

However, the same effects can be achieved even by a configuration in which the BL luminance detection unit 3 detects the luminance value in the front surface of the display panel.

Further, a measurement target of the BL luminance detection unit 3 may be an illumination value rather than the luminance value of the backlight 2, or may be any target as long as the target is a detection standard capable of indicating an amount of light emitted by the backlight 2, including a voltage value applied to drive the backlight 2, a current value flowing in the backlight 2, or the like. When a backlight sensor which measures the light amount of the backlight 2 is a color sensor, a numerical value of RGB to be measured may be a detection target of the BL luminance detection unit 3.

INDUSTRIAL APPLICABILITY

It is possible to realize maintenance of white balance of an image displayed on the liquid crystal panel without causing a user to stop a task for a long period of time, by using the display device as a liquid crystal display device in the field of industry in which the display device is used for a use requiring highly precise color reproduction, such as computer graphics or a medical purpose.

DESCRIPTION OF REFERENCE SYMBOLS

1 BL driving circuit
2 backlight
3 BL luminance detection unit
4 BL driving level detection unit
5 temperature detection unit
6 reference luminance calculation unit
7 chromaticity calculation unit
8 target white point chromaticity setting unit
9 chromaticity correction value calculation unit
10 chromaticity correction circuit
100 display unit

The invention claimed is:

1. A chromaticity correction device that corrects chromaticity of a video signal displayed on a display panel of a display device to correspond to a change in a luminance value of the display panel, the chromaticity correction device comprising:
    a luminance detection unit configured to detect the luminance value;
    a backlight driving level detection unit configured to detect a backlight driving level which is controlling the luminance value;
    a temperature detection unit configured to detect an internal device temperature or an ambient temperature corresponding to a temperature of the backlight;
    a reference luminance value calculation unit configured to estimate a reference luminance value in a characteristic of an initial state in the backlight driving level and the temperature;
    a chromaticity calculation unit configured to obtain a chromaticity change amount of white point chromaticity from the reference luminance value and the luminance value detected by the luminance detection unit and estimated white point chromaticity that is an estimated value of current white point chromaticity from the chromaticity change amount and initial white point chromaticity which is white point chromaticity in the initial state measured in advance;
    a chromaticity correction value calculation unit configured to obtain a chromaticity correction value from the estimated white point chromaticity and target white point chromaticity set in advance; and
    a chromaticity correction circuit configured to correct the chromaticity of the video signal using the chromaticity correction value.

2. The chromaticity correction device according to claim 1, wherein:
    the reference luminance value calculation unit
    includes a conversion expression or a conversion table indicating a correspondence between a luminance value in each combination of a temperature detection value indicating an internal device temperature or an ambient temperature measured in the initial state and the backlight driving level, and a combination of the temperature detection value and the backlight driving level, and obtains a luminance value corresponding to the backlight driving level detected by the backlight driving level detection unit and the temperature detection value detected by the temperature detection unit using the conversion expression or the conversion table, and uses the luminance value as the reference luminance value.

3. The chromaticity correction device according to claim 2, wherein:

the chromaticity calculation unit includes a conversion means indicating a correspondence between a reference luminance ratio and a chromaticity change amount from initial white point chromaticity that is white point chromaticity in an initial state, and obtains the reference luminance ratio using the luminance value detected by the luminance detection unit and the reference luminance value, determines the chromaticity change amount corresponding to the reference luminance ratio using the conversion means, combines the chromaticity change amount with the initial white point chromaticity stored in advance, and uses a combination result as an estimated white point chromaticity.

4. The chromaticity correction device according to claim 1, wherein:

the chromaticity correction value calculation unit includes a conversion means which indicates a correspondence between a result of a comparison of the estimated white point chromaticity and the target white point chromaticity set in advance, and the chromaticity correction value, and determines the chromaticity correction value corresponding to the comparison result to obtain the color correction value.

5. A liquid crystal display device having a function of correcting chromaticity of a displayed video signal to correspond to a change in a luminance value, the liquid crystal display device comprising:

a luminance detection unit configured to detect the luminance value;

a backlight driving level detection unit configured to detect a backlight driving level which is controlling the luminance value;

a temperature detection unit configured to detect an internal device temperature or an ambient temperature corresponding to a temperature of the backlight;

a reference luminance value calculation unit configured to estimate a reference luminance value which is a luminance value in a characteristic of an initial state in the backlight driving level and the temperature detection value;

a chromaticity calculation unit configured to obtain a chromaticity change amount of white point chromaticity from the reference luminance value and the luminance value detected by the luminance detection unit and estimated white point chromaticity that is an estimated value of current white point chromaticity from the chromaticity change amount and initial white point chromaticity which is white point chromaticity in the initial state measured in advance;

a chromaticity correction value calculation unit configured to obtain a chromaticity correction value from the estimated white point chromaticity and target white point chromaticity set in advance;

a chromaticity correction circuit configured to correct the chromaticity of the video signal using the chromaticity correction value; and a display unit configured to display the corrected video signal output from the color correction circuit.

6. A chromaticity correction method for controlling a chromaticity correction device which corrects chromaticity of a video signal displayed on a display panel of a display device to correspond to a change in a luminance value of the display panel, the chromaticity correction method comprising:

detecting the luminance value for a luminance detection process;

detecting a backlight driving level which is controlling the luminance value for a backlight driving level detection process;

detecting an internal device temperature or an ambient temperature corresponding to a temperature of the backlight for a temperature detection process;

estimating a reference luminance value which is a luminance value in a characteristic of an initial state in the backlight driving level and the temperature for a reference luminance value calculation process;

obtaining a chromaticity change amount of white point chromaticity from the reference luminance value and the luminance value detected by the luminance detection process, and obtaining estimated white point chromaticity that is an estimated value of current white point chromaticity from the chromaticity change amount and initial white point chromaticity which is white point chromaticity in the initial state measured in advance for a chromaticity calculation process;

obtaining a chromaticity correction value from the estimated white point chromaticity and target white point chromaticity set in advance for a chromaticity correction value calculation process; and correcting the chromaticity of the video signal using the chromaticity correction value for a chromaticity correction process.

* * * * *